(12) United States Patent
Herman

(10) Patent No.: US 6,755,149 B2
(45) Date of Patent: Jun. 29, 2004

(54) DOUGHNUT GLAZING MACHINE

(75) Inventor: Edward E. Herman, Indianapolis, IN (US)

(73) Assignee: Herman & Company, Inc., Indianapolis, IN (US)

(*) Notice: Subject to any disclaimer, the term of this patent is extended or adjusted under 35 U.S.C. 154(b) by 31 days.

(21) Appl. No.: 10/186,856

(22) Filed: Jul. 1, 2002

(65) Prior Publication Data

US 2004/0000269 A1 Jan. 1, 2004

(51) Int. Cl.[7] .................................................. A23G 3/20
(52) U.S. Cl. ......................... 118/13; 118/324; 118/20; 198/848
(58) Field of Search ........................... 118/13, 324, 20, 118/18, 30, 304, 312, 302; 99/516; 198/583, 626.1, 832, 848

(56) References Cited

U.S. PATENT DOCUMENTS

| | | | |
|---|---|---|---|
| 1,223,687 A | 4/1917 | Fritz | |
| 1,309,106 A | 7/1919 | Savy | |
| 1,775,475 A | 9/1930 | Savy | |
| 1,801,572 A | 4/1931 | Salerno | |
| 1,957,961 A | 5/1934 | Hunter | |
| 2,081,888 A | 5/1937 | Birdsall | |
| 2,182,068 A | * 12/1939 | Clark | ........................ 118/13 |
| 2,260,686 A | 10/1941 | Segrin | |
| 2,320,529 A | 6/1943 | MacManus | |
| 2,348,800 A | 5/1944 | Fredrickson | |
| 2,451,940 A | * 10/1948 | Gendusa | ....................... 118/16 |
| 2,525,306 A | 10/1950 | Lunsford | |
| 2,563,427 A | * 8/1951 | Scott | ........................... 198/583 |
| 3,645,197 A | * 2/1972 | McMeekin et al. | ........ 99/405.4 |
| 3,858,546 A | 1/1975 | Benson et al. | |
| 4,213,417 A | 7/1980 | Ellis | |
| 4,498,635 A | 2/1985 | Fielding | |
| 4,701,340 A | * 10/1987 | Bratton et al. | ............... 426/511 |
| D299,802 S | 2/1989 | Nelson | |
| 5,855,670 A | 1/1999 | Usgaard et al. | |
| 6,119,625 A | 9/2000 | Brummett | |
| 6,159,514 A | 12/2000 | Brummett et al. | |
| 6,201,218 B1 | * 3/2001 | Chandler et al. | ........... 219/388 |

* cited by examiner

Primary Examiner—Richard Crispino
Assistant Examiner—Yewebdar Tadesse
(74) Attorney, Agent, or Firm—Brinks Hofer Gilson Lione

(57) ABSTRACT

Apparatus for applying glaze to warmed doughnuts includes a base, an oven supported on the base, a food finishing area located below the oven, and a discharge area at an output of the food finishing area. A drive mechanism includes first couplings positioned in the food finishing area and discharge area. Supports, fixed to the base, project outward adjacent to each of the drive mechanism first couplings. Two conveyor units are included, each conveyor unit including a chassis and a driving component having a second coupling and supporting belt. Each conveyor unit chassis is mounted on the supports so that the second coupling engages one of the first couplings to provide power from the drive mechanism to the conveyor units' driving components. The conveyors are releasable as a unit from the supports to facilitate cleaning of the apparatus.

26 Claims, 7 Drawing Sheets

DOUGHNUT GLAZING MACHINE

BACKGROUND OF THE INVENTION

The present invention relates generally to machines for applying a glazing, icing or other similar coating to doughnuts, pastries and other comestible articles. The present invention is particularly directed to machines for applying such coatings to fully cooked and pre-frozen doughnuts that have been thawed, heated and glazed shortly or immediately prior to sale to achieve a "fresh" quality.

Doughnuts, while traditionally a morning food to be consumed in conjunction with beverages such as tea or coffee, have become a popular snack item that can be consumed at virtually any time of the day. Many shops and fast service outlets are devoted solely to the manufacture and sale of fresh doughnuts. Other commercial establishments, such as full service grocery stores, smaller convenience stores, fast service and limited menu restaurants, gas stations and even bookstores, have attempted to satisfy the public demand for such food items. The manufacture of fresh doughnuts requires a significant investment in specialized machinery and considerable knowledge and skill unlikely to be possessed by most workers at these other commercial establishments. Further more, the specialized machinery and equipment requires daily cleaning that requires significant non-productive time by personnel. To avoid the substantial investment in equipment and personnel, these other commercial establishments have generally resorted to the sale of doughnuts and pastries that are prepared off-site.

Doughnuts and pastries have a rather short shelf life due principally to the escape of moisture from the cooked article. Applying a glazing, icing or other similar coating over the entire exterior of the article not only enhances the taste, but also seals in a desirable level of moisture that can modestly extend its shelf life. Refrigeration of the finished doughnuts can further extend the shelf life, but almost immediately eliminates the hot, fresh quality desired by consumers. Thus, even well cared for goods often do not match the appeal of the fresh products produced on site at dedicated shops and outlets. There is also the additional problem for conventional off-site production of quickly responding the changes in consumer demand, often on a day-to-day basis. Any unsold products must generally be discarded when the shelf life is exceeded, which can substantially negatively impact the overall profit to be earned from the product.

One alternative that has been employed with modest success in the use of bakery products, particularly raised doughnuts that are cooked and frozen at a central manufacturing facility. The frozen bakery products are delivered to commercial retail establishments in a frozen condition where they can be stored for considerable period before use. The products are typically quickly thawed and heated rapidly to recapture the fresh quality that the consumer desires, and then finished by the addition of a glaze or icing. The batches can be sized to meet the variations in consumer demand on a daily or even hourly basis. While existing apparatus allows retailers to quickly and continually produce desired quantities of "fresh" doughnuts through the day, the application of glazing and icing to the products presents an especially messy problem that still generally requires a measure of skill on the part of the worker, requires considerable cleaning time and effort, and is often very wasteful of the glazing or icing Thus what is needed is a machine that is simple to use and easy to clean to apply the desired amount of glaze, icing, or other finishing fluid onto previously heated doughnuts, pastries or other food products with little waste. It is preferable for the machine to be largely automated so that the entire operation can be operated by one person. It is also desirable that the machine occupy as little floor space as possible, and be reasonably priced so that the cost can be recovered within a reasonable time from the enhanced profits derived from the food products produced by the machine.

Additionally, it is important that the machine be safe to operate, and provided with very simple and clearly marked controls so that the machine is operable by lower level employees. Finally, it is important that the food products produced by the machine have excellent flavor, freshness, and other characteristics likely to enhance customer appeal.

SUMMARY OF THE INVENTION

A machine according to the present invention includes a floor-supported base that can include wheels to permit the apparatus to be easily moved from place to place to permit cleaning, servicing, and the like. The apparatus mounted on the base includes an oven that is generally intended for reheating previously cooked food products but can also be an oven for cooking or completing the cooking process of the food product in question. The oven generally includes a heater mechanism with associated temperature controls. The oven also includes a conveyor for conveying food products through the oven from an intake to an output. A food finishing area is located below the oven where the food products heated in the oven are finished with glaze, icing or the like. A chute is provided that directs the heated food products from the oven output to the food finishing area. A discharge area is located at an output of the food finishing area for receiving food products subsequent to their finishing.

A drive mechanism is connected to the base and includes first couplings positioned in the food finishing area and discharge area. Supports, preferably in the form of rods, are also fixed to the base so that they project outward adjacent to each of the drive mechanism first couplings. Two conveyor units are provided, one being located in the food finishing area and one in the discharge area. Each conveyor unit includes a chassis, a driving component having a second coupling, and a porous belt supported on the chassis and driven by the driving component. Each conveyor unit chassis is mounted on the supports so that the second coupling on the driving component engages one of the first couplings of the drive mechanism to provide power from the drive mechanism to the conveyor units' driving components. Each of the conveyor units is individually releasable as a unit from the supports to facilitate cleaning of the conveyor units.

The conveyor unit in the finishing area receives the heated food products from the chute connected to the oven output and transports the food products through the finishing area. A drawer unit containing a heated water bath is provided below the finishing area. The water bath is intended to receive commercial containers of pre-prepared finishing such as glaze, icing or the like, which is heated by the water bath to a temperature that will facilitate the distribution of the icing or glaze in a fluid state over the food products as they pass through the finishing area. A pump, preferably a peristaltic pump, is provided that has an inlet, which can be submerged in the container of pre-prepared finishing fluid, and has an outlet connected to a distributor located above the conveyor in the finishing area. Finishing fluid, transported by the pump from the commercial supply container to the distributor, falls from the distributor in a predetermined pattern over the heated food products as they are transported through the finishing area by the conveyor unit.

Any excess finishing fluid falls through the porous belt and is directed by a guide positioned below the finishing area conveyor unit back into the supply container. The guide situated below the finishing area conveyor unit can also including a slide forming a portion of the chute that introduces food products onto the finishing area conveyor unit. An air knife can be provided above the finishing area conveyor unit, directly down stream from the distributor, for removing excess finishing fluid from the food products passing through the finishing area. The air knife also initiates a cooling of the glaze, icing or other food finish that traps the desired amount of moisture in the food for maintaining its fresh quality for some period of time. The cooling continues as the food products are transferred to the conveyor unit located in the discharge area. By the time the food products have substantially completed the transport through the discharge area, the finish provided by the glaze or icing is sufficiently set so that the food products can be manipulated by hand onto display racks or trays, or placed in packages ready for the consumer to purchase.

In a preferred embodiment, the conveyor chassis of the two conveyor units in the finishing area and the discharge area includes a pair of parallel side plates. The side plates are secured to each other in parallel relation by a pair of tubular elements having open ends forming channels. The tubular channels are of sufficient size to slidably receive the support rods that project outward from the base adjacent to one of the drive mechanism's first couplings. The distal end of the support rods supporting each of the conveyor units are preferably tapered, and at least one of the support rods includes an engagement element preferably taking the form of a groove adjacent to the distal end. Each of the conveyor units includes a second engagement element for cooperatively engaging the first engagement element to retain the conveyor unit chassis on the supporting rods. The second engagement element preferably takes the form of a latch engagable in the groove, the latch including a handle to permit manual disengagement of the latch from the groove. The latch preferably also includes a stop permitting the latch to only come in tangential contact with the support rod tapered end portion.

Each of the first couplings on the drive mechanism preferably takes the form of a stepped surface or key. The driving component included in each conveyor unit preferably takes the form of a shaft that is coupled to the side plates by suitable journals. A stepped surface is provided on the end of the shaft forming the driving component that can engage the stepped surface on the drive mechanism when the conveyor unit is fully situated on the support rods. A plurality of toothed sprockets are fixed to the shaft forming the driving component that engage in the porous belt for driving said belt. The porous belt preferably takes the form of an open mesh wire belt engaged on the toothed sprockets of the driving component. One or more additional idler shafts can be provided as a part of each conveyor unit to further support the porous belt for movement relative to the conveyor unit chassis.

The conveyor units of the present invention are preferably sized to be easily handled by one person, and can be quickly removed from the machine as a unit to be cleaned in any commercial sink. Any overflow of the glaze, icing or other finishing fluid is continuously returned to the commercial container in which it was initially supplied. At the completion of operation, the unused glaze or icing can be recovered by simply placing the original lid on the commercial container in which it was supplied. The container can be removed from the water bath to suitable storage for subsequent use. The hot water in the water bath can be used to flush through the pump and related tubing to quickly clean the finishing fluid distribution system. Other elements of the machine are similarly designed with ease of cleaning in mind so that clean-up of the machine at the end of the day can be accomplished in a short time, typically in a half-hour or less.

Additional features of a machine of the present invention will become apparent to those skilled in the art from a consideration of the following description of a preferred embodiment. Throughout this description and including the claims it should be understood that the use of the term "first" with reference to any structure is not to be taken as requiring the presence of a "second" of that same or similar structure. Throughout this description and including the claims it should also be understood that the use of a term referencing a structure in the singular does not preclude the repeated or plural presence of that structure, and vice-verse. The following description should be considered in relation to the included drawings that are intended to depict the best mode of carrying out the invention as presently conceived.

DESCRIPTION OF PREFERRED EMBODIMENTS

Figure 1:
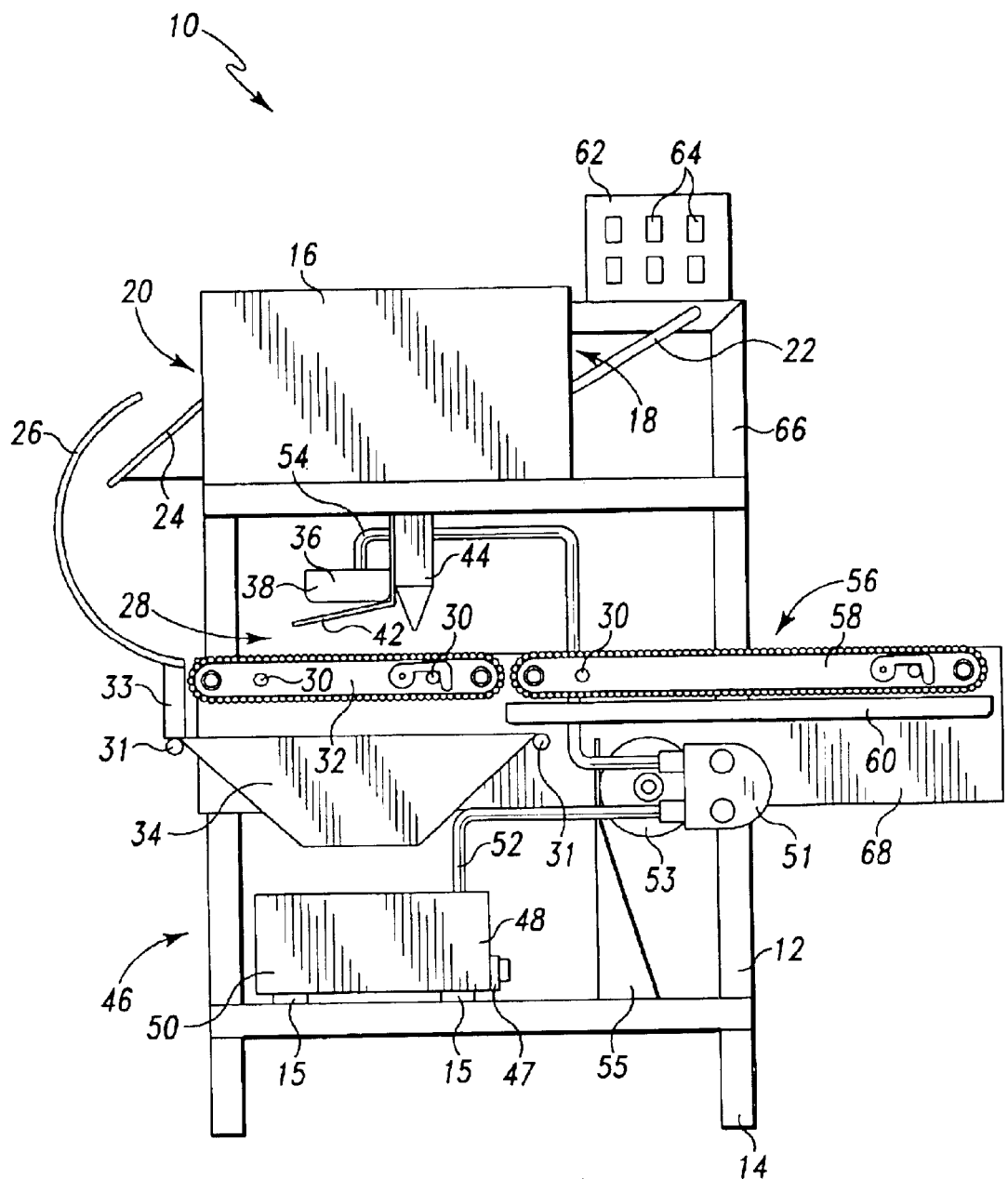
FIG. 1 is a front elevation view of a doughnut glazing machine incorporating features of the present invention.

A doughnut glazing machine 10 according to the present invention is shown in FIGS. 1–4 to include a floor-supported frame 12 including a base 14 that can have wheels to permit the apparatus to be easily moved from place to place, to permit cleaning, servicing, and the like. The apparatus mounted on the frame 12 includes an oven 16, that is generally intended for reheating previously cooked food products but can also be used for cooking or completing the cooking process of the food products. The oven 16 generally includes a heater mechanism with associated temperature controls. The oven 16 also includes a conveyor for conveying food products through the oven from an intake 18 to an output 20. While the oven can include controls for controlling the oven temperature and rate of travel of food products through the oven, the controls are preferably not accessible to the casual operator of the machine 10. Any adjustment of the oven temperature and conveyor speed is preferably preset by the factory and adjustable only by suitably trained service personnel. An intake rack 22 protrudes from the intake 18 sufficiently far to permit the manual introduction of food products, such as doughnuts, into the oven 16. A downwardly inclined slide 24 projects from the output 20 and directs the food products exiting the output 20 of the oven 16 downward toward a chute 26 leading to a food finishing area 28 located below the oven 16.

Figure 4:
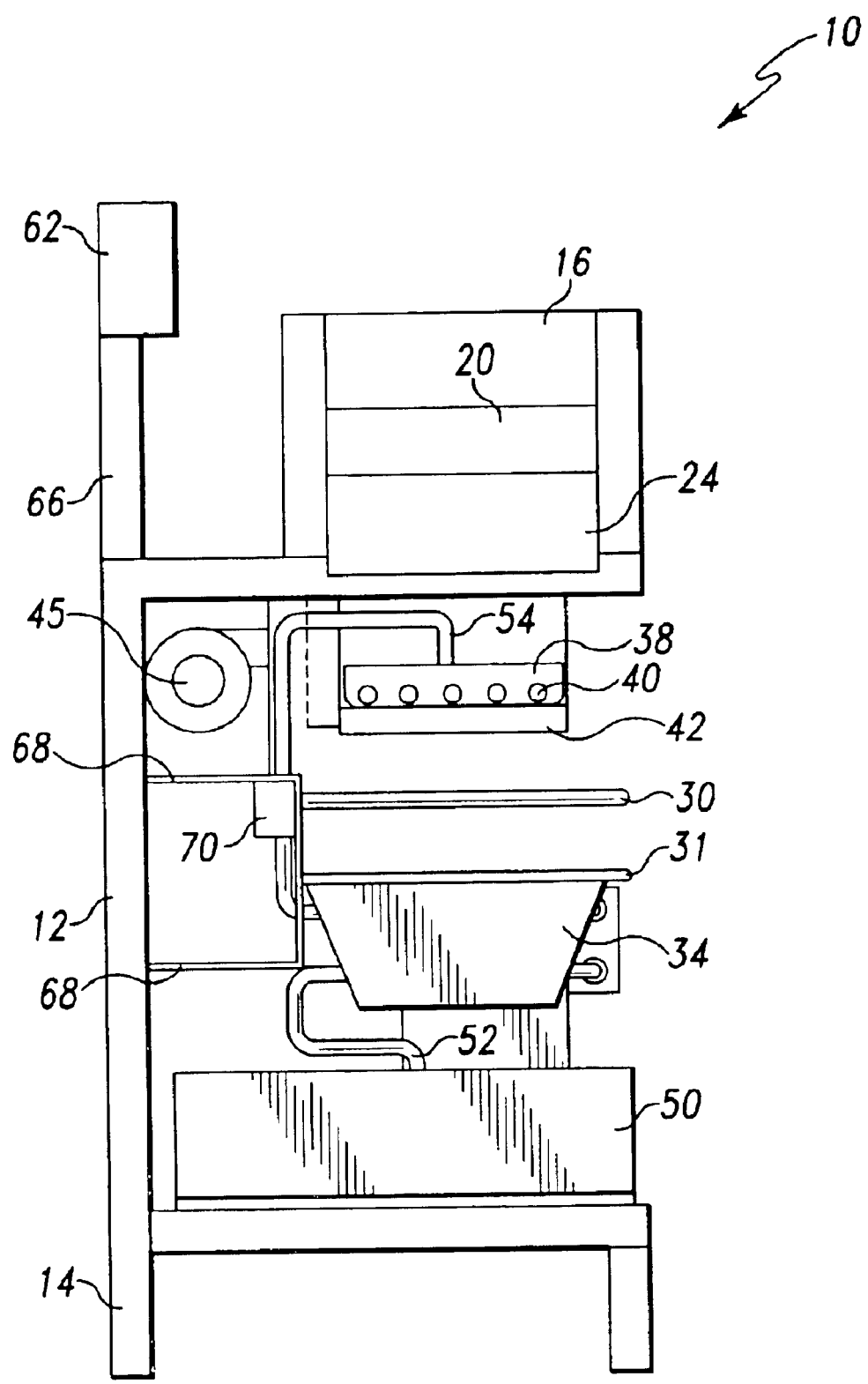
FIG. 4 is a side elevation view similar to FIG. 2 but with the two conveyor units and chute removed to show the support rods and glaze distributor.

The food finishing area 28 is where the food products that are heated in the oven 16 are finished with a glaze, icing or the like. The food finishing area includes a plurality of horizontal rods 30 that project outward from the frame 12 as shown in FIG. 4. A finishing area conveyor unit 32 is supported on a first pair of the rods 30, which preferably have rounded or dome shaped outer ends 29. A funnel-shaped guide 34 us supported on a second pair of the rods 31 below the finishing area conveyor unit 32. A chute support 33 can be coupled to and supported by the guide 34 so that the chute 26 can direct the heated food products from the oven output 20 to the finishing area conveyor unit 32.

Figure 2:
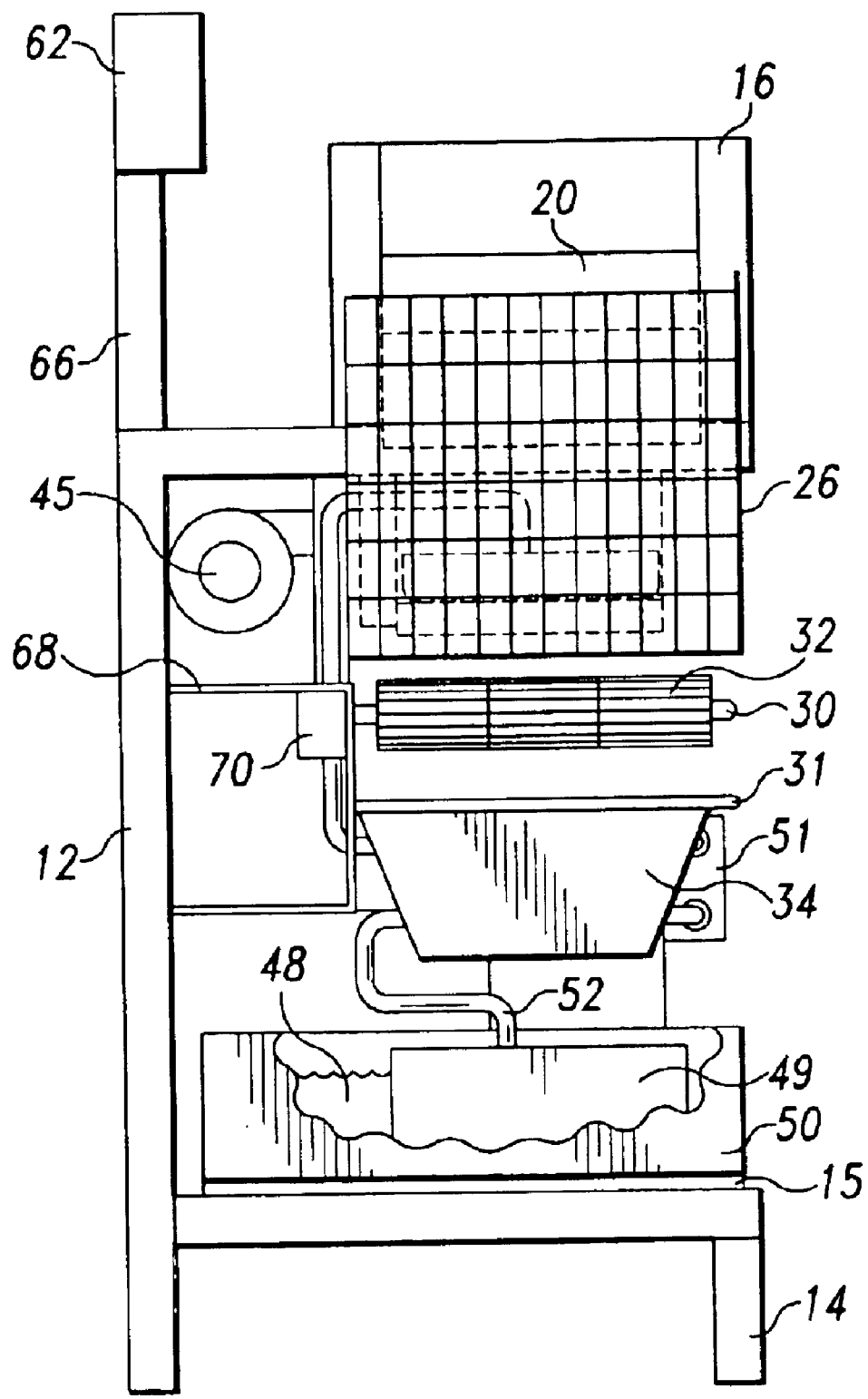
FIG. 2 is an elevation view of the left side of the doughnut glazing machine shown in FIG. 1 partially broken away to show the glazing container within the water bath.
Figure 3:
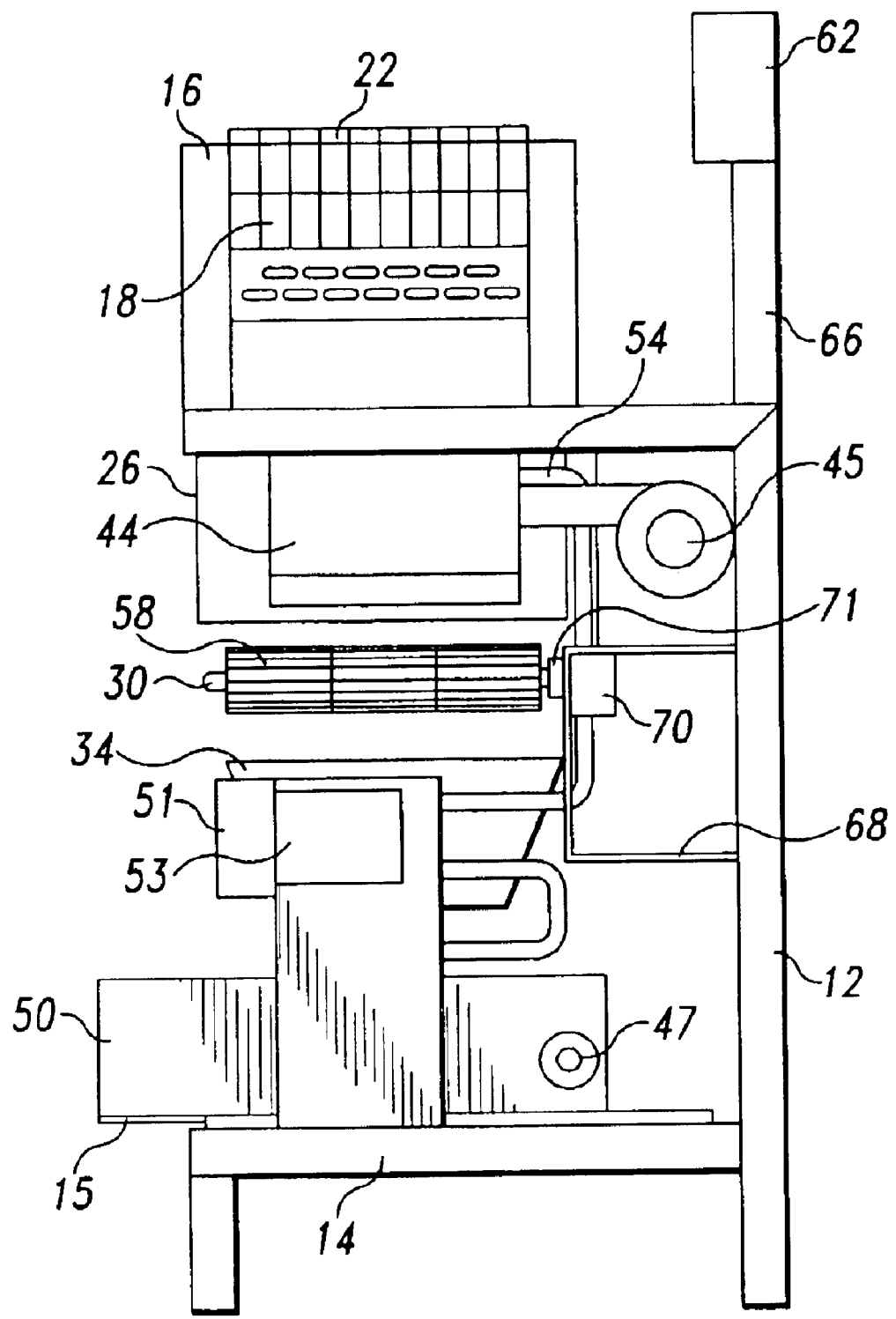
FIG. 3 is an elevation view of the right side of the doughnut glazing machine shown in FIG. 1 with the water bath partly extended.
Figure 5:
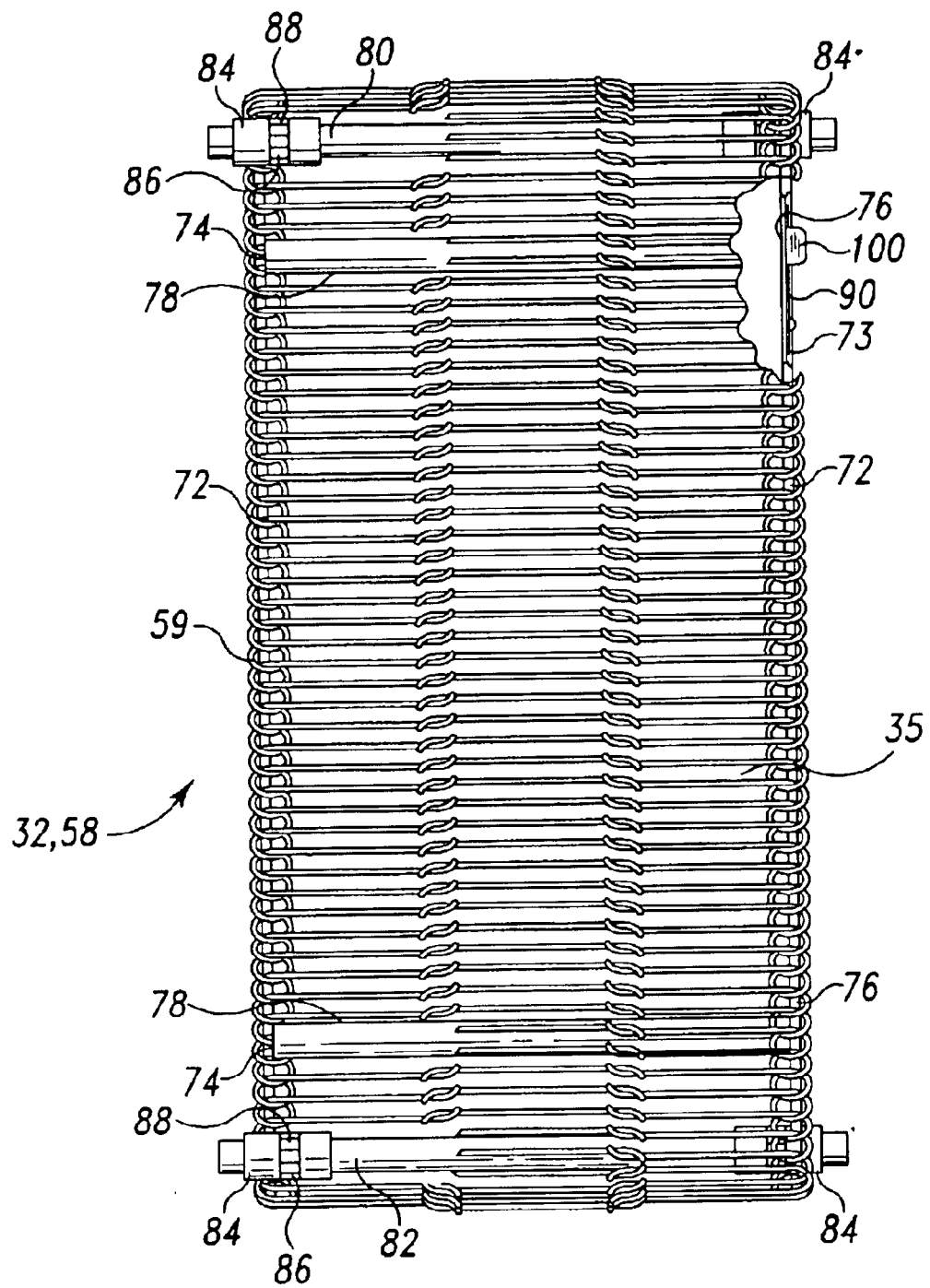
FIG. 5 is a top plan view of one of the conveyor units partially broken away.

A distributor 36 is positioned above the finishing area conveyor unit 32 for distributing the glaze or icing onto any food carried by the conveyor unit 32. The distributor 36 can take a variety of forms. In a preferred form, the distributor 36 comprises a tray 38 having a series of holes 40, as shown in FIG. 4, suspended over an inclined plate 42. The combination of the holes 40 and the inclined plate 42 tend to form a downwardly flowing curtain of fluid glaze or icing, when the glaze or icing is heated to the have the necessary fluidity. The finishing area conveyor unit 32 includes a porous belt 35, as shown in FIGS. 2 and 5, so that the downward flowing curtain of fluid glaze can pass through the finishing area conveyor unit 32 and into the funnel shaped guide 34. The finishing area also include an air knife 44, including a source 45 of filtered air, suspended above the finishing area conveyor unit 32 to generate a downward flow of air that tends to remove any excess glaze or icing from any food product passing below the air knife 44. The downward flow of air from the air knife 44 has the additional benefit of initiating a cooling of the glaze so that the food products can, subsequently, be more easily handled by the machine operator.

A supply area 46 is located below the food finishing area 28. The supply area 46 includes a water bath 48 including a heater 47 that is preferably situated in a drawer assembly 50, which is movable relative to the frame 12 on drawer slides 15. The water bath 48 is intended to receive commercial containers 49 of pre-prepared finishing such as glaze, icing or the like as shown in FIG. 2. The contents of the commercial container 49 is heated by the water bath 48 to a temperature that will facilitate the distribution of the icing or glaze in a fluid state over the food products as they pass through the finishing area 28. A pump 51, preferably taking the form of a peristaltic pump and motor 53 supported on stand 55, is provided that has an inlet tube 52, which can be submerged in the container of pre-prepared finishing fluid 49. The pump 51 also has an outlet tube 54 connected to the distributor 36 located above the finishing area conveyor unit 32. Finishing fluid, when sufficiently heated by the water bath 48, is transported by the pump 51 from the commercial supply container 49 to the distributor 36, falls from the distributor 36 in a curtain or other predetermined pattern over the heated food products as they are transported through the finishing area 28 by the conveyor unit 32. Any excess finishing fluid falls through the porous belt 35 of the finishing area conveyor unit 32 and is directed by guide 34 back into the supply container 49 that is situated in the water bath 48. Thus, during a coating operation, the flow of finishing fluid is continuously repeated and a substantial number of doughnuts or other pastries can be coated without stopping the machine either for re-supply or cleaning.

A discharge area 56 is located adjacent to the food finishing area 28 for receiving food products subsequent to the addition of glaze, icing, etc. The discharge area 56 includes a conveyor unit 58 that is situated immediately adjacent to the finishing area conveyor unit 32 so that the food products are automatically transferred from conveyor unit 32 to conveyor unit 58. A tray 60 is preferably provided below the discharge area conveyor unit 58 to prevent any glaze or icing from falling onto the floor. The length of the conveyor unit 58, and its operating speed are selected so that by the time the food products have substantially completed the transport through the discharge area 56, the finish provided by the glaze or icing is set and the food products can be manipulated by hand onto display racks or trays, or placed in packages ready for the consumer to purchase. While additional racks and trays can be added to the discharge area, it will be appreciate that it is generally desired to contain the apparatus to as small an area as possible to permit its accommodation is smaller retail outlets such as convenience stores, and the like.

The oven 16, conveyors 32 and 58, heater 47, pump 51 and air source 45 are supplied power through a common control panel 62 that is fixed to the frame 12 in a convenient position facing the machine operator. The control panel 62 includes a number of switches 64 for controlling the supply of power to the various elements of the machine 10. Electrical power is preferably supplied to the machine 10 through a single power cable, and is distributed from the control panel to the various elements by electrical cables running through a common chase 66 that is connected to a motor housing 68. Motors 70 for operating the conveyors 32 and 58 are situated within the motor housing 68. A first coupling 71, preferably in the form of a stepped surface or key, is connected to each motor 70 that projects through motor housing 68 into the food finishing area 28 and discharge area 56.

Figure 8:
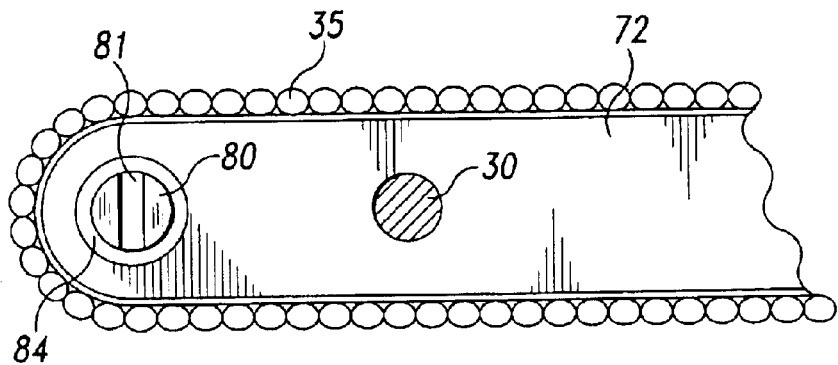
FIG. 8 is an elevation view of a portion of one of the conveyor units from a side opposite that shown in FIGS. 6 and 7 showing the driving component engagement mechanism.

An important feature of a machine 10 of the present invention is its facility for ease of cleaning. An important feature that contributes to this facility is the use of conveyor units 32 and 58 that are conveniently handled as a single assembly. A representative conveyor unit 32, 58 is shown in greater detail in FIG. 5 to include a chassis 59 having pair of longitudinal panels 72, including outwardly extending ledges 73, situated at the lateral edges of the conveyor unit. The two ends 74 and 76 of at least two tubing elements 78 are coupled to the longitudinal panels 72 so that the panels are situated at a prescribed distance from each other. Shafts 80 and 82 are coupled to the panels 72 by suitable journals 84 to that the shafts 80 and 82 can rotate with respect to the longitudinal panels 72. Sprockets 86 are fixed to the shafts 80 and 82, the sprockets 86 including teeth 88 that engage the porous belt 35, which is preferably made of stainless steel wire. One or more additional idler shafts, and additional sprockets, can be provided as a part of each conveyor unit 32, 58 to further support the porous belt 35 for movement relative to the conveyor unit chassis 59. Any rotation of either shaft 80 or 82 causes the porous belt 35 to move with respect to the chassis 59, which in turn also causes the other shaft 82 or 80 to rotate. At least one of the shafts 80 or 82 includes a coupling feature, such as the coupling slot 81 shown in FIG. 8 which is adapted to be coupled to a corresponding coupling element 71 on a projecting shaft from one of the drive motors 70. The coupling slot 81 engages the stepped surface on the drive mechanism 71 only when the conveyor unit 32, 58 is fully situated on the support rods 30.

Figure 6:
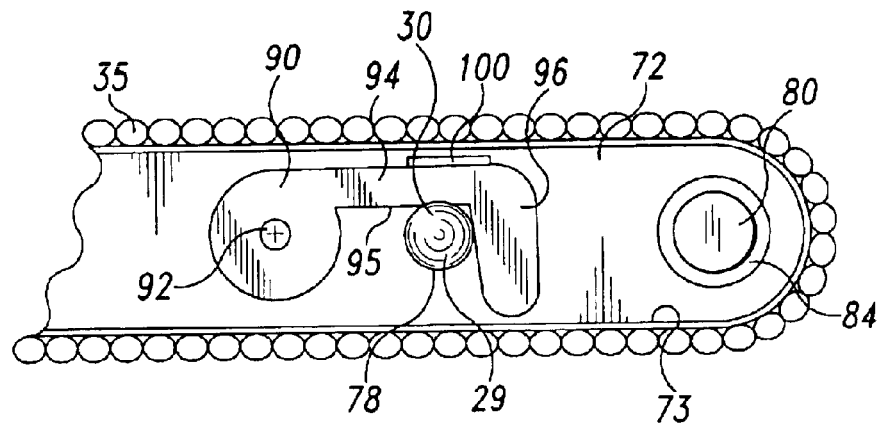
FIG. 6 is an elevation view of a portion of one of the conveyor units showing the latch mechanism for engaging one of the supports.
Figure 7:
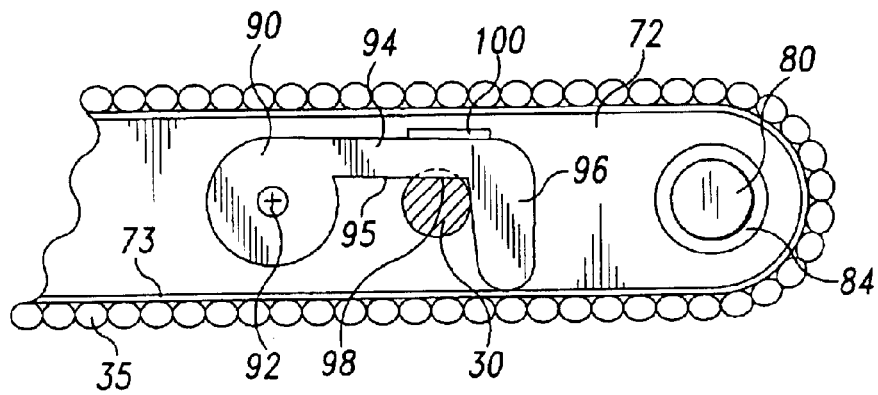
FIG. 7 is an elevation view similar to FIG. 4, the support rod being shown partially in section to show the engagement with the latch.

The tubing elements 78 include open ends and are of sufficient size to be slidably received over the support rods 30. This arrangement of cooperatively engaging support rods 30 and tubing elements 78 permits the conveyor units 32 and 58 to be easily and quickly installed on and removed from the machine 10 as a whole unit. The disassembly of the conveyor units is not necessary to permit the units to be completely cleaned after each glazing operation. The retention of the conveyor units 32 and 58 on the support rods 30 is facilitated by the use of a latch 90 shown in FIGS. 5–7 and located on the opposite side from the coupling slot 81. The latch 90 includes a pivot member 92 supported on one of the panels 72 of the conveyor unit. An arm 94 projects outwardly from the pivot member 92 and includes a downwardly extending end portion 96 adapted to contact ledge 73 of longitudinal panel 72 and thus form a stop so that the arm 94 cannot block the opening 77 into the interior of the tubing element 78. As the conveyor unit tubing elements 78 are slipped over the outwardly projecting support rods 30, the domed end portion 29 of the support rod contacts and displaces the arm 94 so that a lower surface 95 of the arm rests on the top of support rod 30, as shown in FIG. 6. A slot 98 is provided in the upper surface of at least one of the support rods 30, the slot 98 being of sufficient width to receive the lower surface 95 of arm 94 to retain the conveyor units on the support rods 30. The latch 90 also includes a handle 100 that permits the latch to be quickly and easily disengaged from the slot 98 to permit removal of the conveyor as a unit from the machine 10. Once removed from the machine 10, the conveyor assembly can be easily washed in a commercial sink, or commercial dishwasher without further disassembly.

Figure 9:
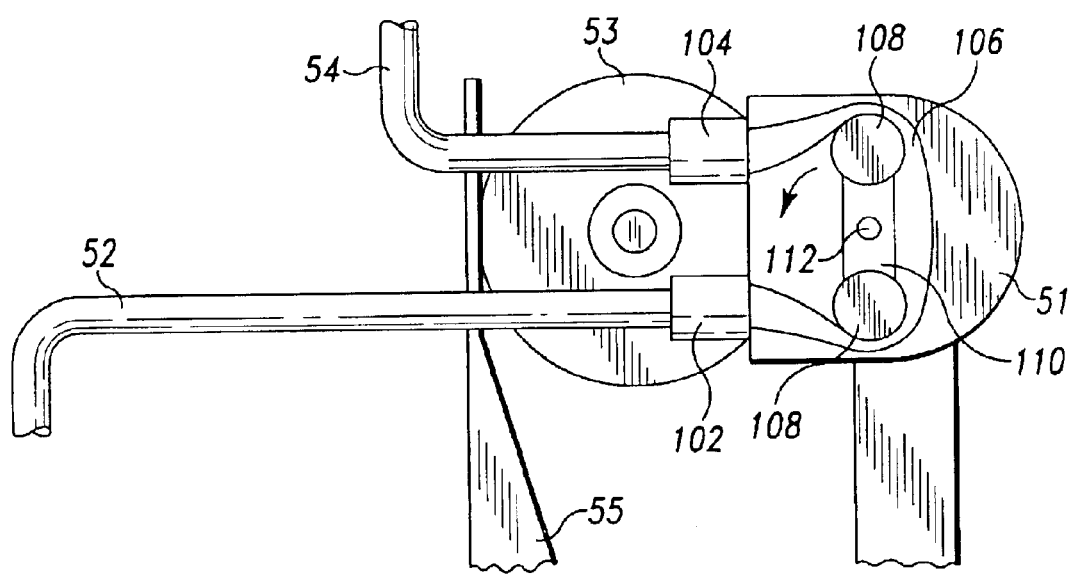
FIG. 9 is an elevation detail view of the peristaltic pump used in the preferred embodiment of the present invention.

Another important feature that contributes to the ease of cleaning of the machine 10 is the use of a peristaltic pump 51 and motor 53 supported on stand 55. The peristaltic pump 51 has an inlet coupling 102 for engaging the inlet tube 52 that has a distal end that can be submerged in the container of pre-prepared finishing fluid 49. As shown in FIG. 9, the peristaltic pump 51 also has an outlet coupling 104 for engaging the outlet tube 54 connected to the distributor 36 located above the finishing area conveyor unit 32. A segment of elastic, flexible tubing 106 is coupled between the inlet coupling 102 and outlet coupling 104 and surrounds a pair of rollers 108 coupled to the ends of pivot arm 110. The pivot arm 110 is rotated about an axis 112 by motor 53 in the direction R. The rotation of the pivot arm 110 causes a repeated squeezing action on the flexible tubing 106, which propels the finishing fluid from the container 49 to the distributor 36. While FIG. 9 shows only a single segment of flexible tubing 106, it will be apparent to those skilled in the art that more than one such tubing segment 106 can be employed with more than one set of rollers 108 to achieve the desired volume of flow of finishing fluid. In this way, the finishing fluid is wholly contained within tubing 52, 106, and 54 during its transport from the container 49 to the distributor 36.

At the completion of a glazing operation, the distal end of inlet tubing 52 is removed from the container 49 of pre-prepared finishing fluid. After any excess glaze is allowed to drain from the distributor 36 and the funnel shaped guide 34 back into the container 49, the container 49 is removed from the water bath 48 and stored for use in a subsequent glazing operation. A suitable surfactant such as a commercial soap or a detergent can then be added to the water bath 48, which is generally still hot. The distal end of the inlet tubing 52 can then be inserted into the water bath and the pump 51 can be supplied with power so that the still hot water and surfactant flows upward through the tubing 52, 106, and 54, and downward through the distributor 36 and guide 34, thus substantially cleaning the main flow path for the glaze or other finishing fluid. Clean rinse water can be substituted for the initial water-surfactant mixture as required until the system is cleared of all glaze. The tubing 52 and 54 can then be uncoupled from the pump 51, and the flexible tubing 106 removed from the pump to remove any moisture from the tubing so that it is ready for the next glazing operation. The remainder of the machine 10 is easily wiped down to meet the necessary food handling cleanliness standards required of food machinery. Since the glaze is pumped upward completely within the tubing 52, 106 and 54, there is no emersion of a pumping mechanism or a food product transport mechanism into the glaze or other food finishing liquid. As a result, the clean up of the machine 10 can be accomplished within an acceptably short period of time, typically in a half-hour or less.

While the present invention has been described with reference to the illustrated preferred embodiment, it will be appreciated by those skilled in the art that other embodiments can be constructed that fall within the spirit of the present invention as claimed in the following claims.

What is claimed is:

1. Apparatus for finishing food products comprising a base, a drive mechanism connected to the base and including a first coupling, two horizontally projecting rods fixed to the base and projecting outward adjacent to the drive mechanism first coupling, a first conveyor unit including a chassis having a pair of parallel side plates and tubular elements coupling the side plates to each other, the tubular elements forming channels for receiving the rods, and a driving component having a second coupling and supporting a belt, the first conveyor unit chassis being mounted on the supports so that the second coupling engages the first coupling to provide power from the drive mechanism to the first conveyor unit driving component, the first conveyor unit being releasable as a whole from the support to facilitate cleaning of the first conveyor unit.

2. The apparatus of claim 1 wherein one of the support rods includes a first engagement element and the first conveyor unit chassis includes a second engagement element cooperatively engaging the first engagement element to releasably mount the first conveyor unit chassis on the supporting rods.

3. The apparatus of claim 2 wherein the first engagement element comprises a groove adjacent a distal end of the support rod and the second engagement element comprises a latch engagable in the groove, the latch including a handle to permit manual disengagement of the latch from the groove.

4. The apparatus of claim 3 wherein the distal end of the support rod includes a tapered end portion and the manually releasable latch includes a stop permitting the latch to only come in tangential contact with the support rod tapered end portion.

5. The apparatus of claim 1 wherein said driving component comprises a shaft, journals coupling the shaft to the side plates, and a plurality of toothed sprockets fixed to the shaft for driving said belt.

6. The apparatus of claim 5 wherein said belt comprises an open mesh wire belt engaged on the toothed sprockets of the driving component.

7. The apparatus of claim 5 wherein said second coupling comprises a stepped surface on the end of the shaft and said first coupling comprises a mirrored surface on said drive mechanism interlocking with the second coupling.

8. The apparatus of claim 1 further comprising a supply of finishing fluid situated below the first conveyor unit, a distributor positioned above the first conveyor unit, and a peristaltic pumping unit for pumping finishing fluid from the supply to the distributor for distribution over food products conveyed by the first conveyor unit between the distributor and the supply.

9. The apparatus of claim 8 further comprising a guide positioned below the first conveyor unit for directing any overflow finishing fluid toward the supply, the guide also including a slide portion for introducing food products onto the first conveyor unit.

10. The apparatus of claim 9 further comprising a heating bath situated below the first conveyor unit and guide for heating the supply of finishing fluid to a temperature suitable for addition to food products, and an oven situated above the first conveyor unit for heating the food products to a temperature suitable to receive the finishing fluid.

11. The apparatus of claim 10 further comprising a drawer unit reciprocally mounted with respect to the base, the drawer unit receiving the heating bath.

12. The apparatus of claim 10 further comprising a second conveyor unit located within the oven having an end located above the slide portion of said guide.

13. The apparatus of claim 8 further comprising another conveyor unit situated to receive food products from the first conveyor unit, said another conveyor unit being coupled to said drive mechanism.

14. The apparatus of claim 13 further comprising a tray situated below said another conveyor unit, and hanger elements coupled to the tray and engaging said supports for suspending the tray with respect to said base.

15. The apparatus of claim 13, further comprising an air knife positioned over the first conveyor unit and guide with an outlet producing a downward flowing curtain of air across the first conveyor to remove excess finishing fluid from food products passing through the curtain.

16. The apparatus of claim 15 wherein the air knife comprises an air inlet and a filter coupled to the air inlet for filtering the air to form the curtain of air.

17. The apparatus of claim 16 further comprising a power control panel fixed to the base including controls for supplying power to said drive mechanism, said heating bath, said oven, said peristaltic pumping unit, and said air knife.

18. Apparatus for finishing food products comprising a base, an oven supported on the base, a food finishing area located below the oven, and a discharge area at an output of the food finishing area, a drive mechanism connected to the base and including first couplings positioned in the food finishing area and discharge area, supports fixed to the base and projecting outward adjacent to each of the drive mechanism first couplings, two conveyor units, each conveyor unit including a chassis and a driving component having a second coupling and supporting an belt, each conveyor unit chassis being mounted on the supports so that the second coupling engages one of the first couplings to provide power from the drive mechanism to the conveyor units' driving components, the conveyors being individually releasable as a unit from the supports to facilitate cleaning of the conveyor units.

19. The apparatus of claim 18 wherein the second couplings comprise stepped surfaces on the end of a shaft carried by each chassis, and the first couplings comprise mirrored surfaces on each drive mechanism interlocking with the second couplings.

20. The apparatus of claim 18 wherein each of the conveyor chassis includes a pair of parallel side plates and tubular elements coupling the side plates to each other, the tubular elements receiving the outwardly projecting supports.

21. The apparatus of claim 18 wherein one of the supports for each conveyor unit chassis includes a first engagement element and each conveyor unit chassis includes a second engagement element cooperatively engaging the first engagement element to releasably mount each conveyor unit chassis on the supports.

22. The apparatus of claim 21 wherein the first engagement element comprises a groove adjacent a distal end of each support and the second engagement element comprises a latch carried by each chassis engagable in the groove, the latch including a handle to permit manual disengagement of the latch.

23. The apparatus of claim 22 wherein the distal end of each support includes a tapered end portion and the manually releasable latch includes a stop permitting the latch to only come in tangential contact with the support tapered end portion.

24. The apparatus of claim 20 wherein said driving component comprises a shaft, journals coupling the shaft to the side plates, and a plurality of toothed sprockets fixed to the shaft for driving said belt.

25. The apparatus of claim 24 wherein said belt comprises an open mesh wire belt engaged on the toothed sprockets of the driving component.

26. The apparatus of claim 18 further comprising a chute for directing food products from the oven to the food finishing area located below the oven.

* * * * *